May 28, 1935.  B. P. KINNEY  2,002,635
DISPENSING DEVICE
Filed May 17, 1933
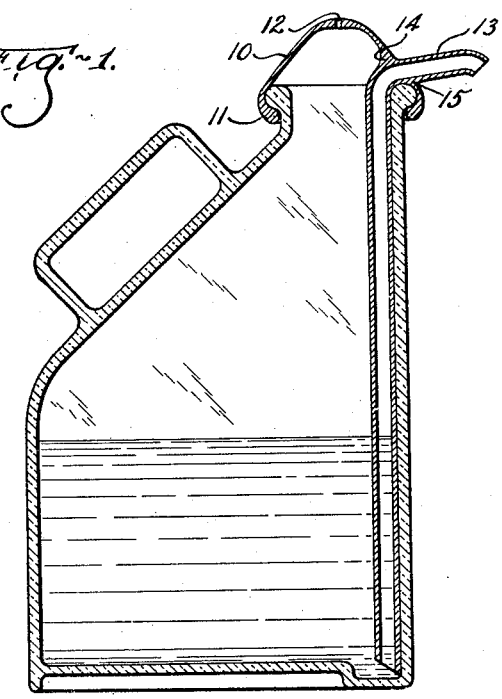
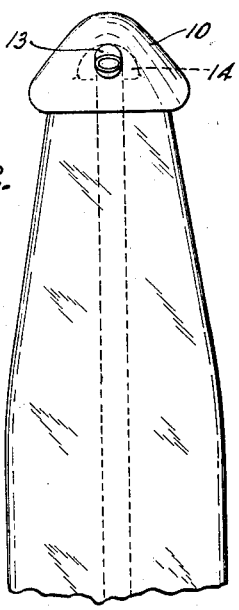
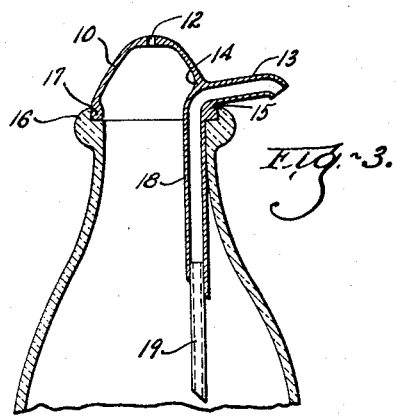
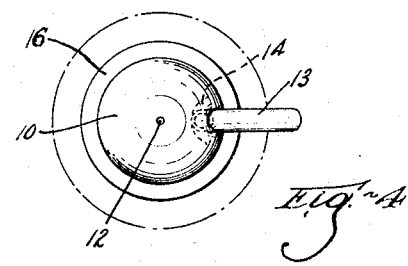
INVENTOR
BREWSTER P. KINNEY
BY
Brockett, Hyde, Higley & Meyer
ATTORNEYS Patented May 28, 1935

2,002,635

UNITED STATES PATENT OFFICE 2,002,635

DISPENSING DEVICE

Brewster P. Kinney, Cleveland Heights, Ohio

Application May 17, 1933, Serial No. 671,532

1 Claim. (Cl. 221—76)

This invention relates to a device for dispensing small quantities of liquid from a container. It is adapted for use in dispensing syrups at soda fountains, for extracting cream or milk from bottles and similar like uses.

An object of this invention is to provide a simple device with as few parts as possible.

Another object of the invention is to provide an extractor in which neither the inlet or discharge end of the extractor tube will be subjected to any great amount of movement during the extraction of the liquid. Simple devices heretofore proposed for this service have agitated the liquid within the container, which is a disadvantage for instance when separating cream from the top of a milk jar. It is apparent that movement of the discharge end of the dispensing tube is always objectionable because of the danger of spilling the extracted fluid.

My invention accomplishes the above purposes while at the same time being of very cheap construction and not easily damaged in use.

Other objects and advantages of my invention will be apparent as set forth in the specification and illustrated in the drawing, and the essential features of which are summarized in the claim.

In the drawing, Fig. 1 is a sectional view of my device as applied to a syrup dispenser; Fig. 2 is an end view of the same; Fig. 3 is a partial sectional view of my device applied in a slightly different manner to a milk bottle; and Fig. 4 is a plan view of the same.

In general, my dispensing device comprises a diaphragm of suitable flexible material such as rubber, and preferably of concavo-convex form, the free edges thereof being adapted to engage the mouth of any container with which it is designed to be used. The diaphragm is provided with a vent and may be operated by the fingers to eject liquid from the container with or without a siphonic effect. The discharge tube of the device, which is preferably formed integrally with the diaphragm, may extend any desired distance within and without the container.

The form of the device shown in Fig. 1 comprises a dome shaped diaphragm 10, the edges of the skirt of which are preferably thickened as shown at 11, said diaphragm being provided in its upper portion with a port or opening 12, the edges of which are also preferably thickened. The manner in which the diaphragm engages the mouth of the container may be varied. In Fig. 1 the inturned lip 11 embraces the bead about the mouth of the container, holding the device securely in place. In Fig. 3, however, I show the diaphragm resting in a recess of a container, in a more readily removable manner. The discharge tube 13 may extend the full depth of the container, or it may have an adjustable extension as hereinafter described. The tube as shown has a short dripless spout or nozzle.

Where the tube passes through the diaphragm, the material is thickened and strengthened as indicated at 14 and 15 which serves to maintain the rigidity of both the inner and outer ends of the discharge tube, when the device is in use. The operator, using my device, places his finger over the port 12 and presses the diaphragm inwardly, thus creating a pressure upon the liquid in the container and forcing a small amount of the same through the tube 13. Upon release of the pressure, the diaphragm will resume its original position and the operation may be repeated as often as desired.

In Figs. 3 and 4, I have illustrated a slightly modified form of the device as applied to a milk bottle. The bottle has the usual peripheral flange 16 within which the free edges of the diaphragm are adapted to fit snugly. The edges of the diaphragm are thickened as before described and are preferably rounded, as at 17, to permit the diaphragm to maintain a tight seal as it is depressed. The tube 18 as furnished to the user may be of a length sufficient to reach the bottom of the container, thus permitting the user to cut the tube as he desires, or, as illustrated in Fig. 3, the rubber portion of the tube 18 may be cut at the approximate depth of the cream layer in the bottle, and an extension tube 19 may be used if milk is to be extracted from the bottle. The other parts of the device are substantially as described in connection with Figs. 1 and 2.

In use, the tube 18 would be used as illustrated if small amounts of cream were to be extracted from the bottle, but if milk was to be extracted without disturbing the cream, the extension tube 19 would be inserted before the device was applied to the bottle. The diaphragm would then be operated as before described.

It will be seen that I have devised a liquid dispenser which may be cheaply constructed; it involves only one piece; it is quickly and easily applied to a container; it may be thrown into boiling water for sterilizing purposes; and it is unbreakable during the life of the rubber. At the same time, the dispensing tube is held adjacent one edge of the container mouth and supported by an extra amount of rubber in a manner to hold both the inner and outer ends of the tube substantially immobile.

I claim as my invention:

A liquid dispensing closure device for the mouth of a portable, liquid-receiving bottle or the like, said device comprising a generally dome-shaped member of flexible material and having a generally cylindrical skirt portion for removable securement about the neck of such a bottle or the like in closing relation with the mouth thereof, the generally dome-shape of said member providing an air chamber above the mouth of said bottle or the like and the upper portion of said member being provided with a through air port, a part of the skirt portion of said member being reinforced by increasing the thickness thereof and such reinforced part having a liquid-dispensing tubular element extending therethrough, said tubular element having an inner portion adapted to extend downwardly into the liquid in such a bottle or the like and also having an outer spout portion for dispensing such liquid, said outer spout portion terminating at a level above that of the lower end of the skirt portion of said member.

BREWSTER P. KINNEY.